(12) United States Patent
Carminati et al.

(10) Patent No.: US 12,729,730 B2
(45) Date of Patent: Sep. 8, 2026

(54) DOUBLE-LAYER BRAKE DISC IN NICKEL-FREE STEEL AND MANUFACTURING METHOD

(71) Applicant: Brembo S.p.A., Curno (IT)

(72) Inventors: Fabiano Carminati, Curno (IT); Simone Biondo, Curno (IT); Stefano Medici, Curno (IT); Salvatore Giammarinaro, Curno (IT)

(73) Assignee: Brembo S.p.A., Curno (IT)

( * ) Notice: Subject to any disclaimer, the term of this patent is extended or adjusted under 35 U.S.C. 154(b) by 385 days.

(21) Appl. No.: 18/258,862

(22) PCT Filed: Dec. 23, 2021

(86) PCT No.: PCT/IB2021/062238
§ 371 (c)(1),
(2) Date: Jun. 22, 2023

(87) PCT Pub. No.: WO2022/137191
PCT Pub. Date: Jun. 30, 2022

(65) Prior Publication Data

US 2024/0044384 A1 Feb. 8, 2024

(30) Foreign Application Priority Data

Dec. 24, 2020 (IT) ........................ 102020000032417

(51) Int. Cl.
*F16D 65/12* (2006.01)
*C23C 28/00* (2006.01)
(Continued)

(52) U.S. Cl.
CPC .......... *F16D 65/127* (2013.01); *C23C 28/321* (2013.01); *C23C 28/341* (2013.01);
(Continued)

(58) Field of Classification Search
CPC ........... F16D 65/12–128; F16D 69/027; F16D 2065/1316; F16D 2065/132;
(Continued)

(56) References Cited

U.S. PATENT DOCUMENTS 4,715,486 A 12/1987 Burgdorf et al.
2011/0278116 A1 11/2011 Lembach et al.
(Continued)

FOREIGN PATENT DOCUMENTS

CN 106415048 A 2/2017
CN 110925339 A 3/2020
(Continued)

OTHER PUBLICATIONS

Italian Patent Office, Search Report in Application No. IT2020000032417, dated Aug. 18, 2021, 2 pages.
(Continued)

*Primary Examiner* — Christopher P Schwartz
(74) *Attorney, Agent, or Firm* — Marshall & Melhorn, LLC

(57) ABSTRACT

A brake disc for disc brake comprises a braking band made of gray cast iron or steel, provided with two opposite braking surfaces, each of which defines at least partially one of the two main faces of the disc. The brake disc is provided with a base layer totally nickel-free and one or more carbides included in the nickel-free steel, which covers at least one of the two braking surfaces of the braking band. An intermediate layer composed of nickel-free steel is interposed between the base layer and at least one of the two braking surfaces of the braking band.

14 Claims, 6 Drawing Sheets

(51) Int. Cl.
*F16D 69/02* (2006.01)
*F16D 65/02* (2006.01)

(52) U.S. Cl.
CPC ......... *F16D 65/125* (2013.01); *F16D 69/027* (2013.01); *F16D 65/123* (2013.01); *F16D 2065/1316* (2013.01); *F16D 2065/132* (2013.01); *F16D 2200/0013* (2013.01); *F16D 2200/0021* (2013.01); *F16D 2250/0046* (2013.01)

(58) Field of Classification Search
CPC ..... F16D 2200/0013; F16D 2200/0021; F16D 2200/0046; C23C 28/321; C23C 28/341
USPC .................................................... 188/218 XL
See application file for complete search history.

(56) References Cited

U.S. PATENT DOCUMENTS

| | | | | |
|---|---|---|---|---|
| 2011/0293849 | A1 * | 12/2011 | Lembach | F16D 65/127 148/284 |
| 2015/0159710 | A1 | 6/2015 | Holly et al. | |
| 2016/0215839 | A1 | 7/2016 | Bruggen et al. | |
| 2016/0290423 | A1 | 10/2016 | Tironi et al. | |
| 2017/0016497 | A1 | 1/2017 | Haug | |
| 2017/0122392 | A1 * | 5/2017 | Lembach | F16D 69/04 |
| 2019/0056003 | A1 | 2/2019 | Carminati et al. | |
| 2020/0072307 | A1 | 3/2020 | Rettig et al. | |
| 2022/0065313 | A1 * | 3/2022 | Carminati | F16D 65/125 |

FOREIGN PATENT DOCUMENTS

| | | | | |
|---|---|---|---|---|
| DE | 60215655 | T2 | 8/2007 | |
| DE | 102011056307 | A1 | 6/2013 | |
| DE | 102011089864 | A1 | 6/2013 | |
| DE | 102014006064 | A1 | 6/2015 | |
| DE | 202018107169 | U1 | 1/2019 | |
| DE | 102019210088 | A1 | 3/2020 | |
| DE | 102019212844 | A1 | 3/2020 | |
| DE | 102019207291 | A1 | 11/2020 | |
| DE | 102019208411 | A1 | 12/2020 | |
| DE | 102020112100 | A1 | 11/2021 | |
| EP | 1336054 | B1 | 9/2008 | |
| EP | 3034902 | A1 | 6/2016 | |
| EP | 3620546 | A2 * | 3/2020 | C23C 28/02 |
| EP | 4267864 | A1 | 11/2023 | |
| EP | 4146428 | B1 | 2/2025 | |
| JP | 2016503149 | A | 2/2016 | |
| JP | 2017514992 | A | 6/2017 | |
| JP | 2017523353 | A | 8/2017 | |
| JP | 2020528531 | A | 9/2020 | |
| WO | 2010089048 | A1 | 8/2010 | |
| WO | 2014097186 | A1 | 6/2014 | |
| WO | 2014097187 | A1 | 6/2014 | |
| WO | 2015007497 | A1 | 1/2015 | |
| WO | 2017046681 | A1 | 3/2017 | |
| WO | 2019021161 | A1 | 1/2019 | |
| WO | 2020128600 | A1 | 6/2020 | |
| WO | 2021170216 | A1 | 9/2021 | |
| WO | 2021224308 | A1 | 11/2021 | |

OTHER PUBLICATIONS

European Patent Office, Search Report and Written Opinion in Application No. PCT/IB2021/062238, dated Mar. 25, 2022, 12 pages, Rijswijk, Netherlands.

Department of Engineering Science, University West, Sweden Coatings for Automotive Gray Cast Iron Brake Discs: A Review—27 pages Published Aug. 27, 2019 Trollhattan, Sweden.

Thomas Schopphoven, Johannes Henrich Schleifenbaum, Maximilian Voshage and Tobias Philipp UTSCH Laser Coating of Brake Discs with Adjusted Finishing—VDI-Z BD.161 (2019) No. 7/8—5 pages Germany.

Wikipedia Page Subject: Brake Disc—Jul. 9, 2018—9 pages.

Team Edelstahl Material Data Sheet, 1.4512—2 pages Kevelaer, Germany.

VDM Metals Material Data Sheet No. 8103 Revision 01 VDM Aluminum Chrome W—Nov. 23, 2020—10 pages Werdohl, Germany.

Hochleistungwerkstoffe Stahl & Metall (HSM) Material Data Sheet—1.4521/X2CrMoTi18-2, Stainless Steel, Ferritic—2 pages Germany.

Team Edelstahl Material Data Sheet, 1.4021—Martensitic Corrosion-resistant Stainless Steel—2 pages Kevelaer, Germany.

Thyssenkrupp Martensitic Steel—REMANIT-4028, Material No. 1.4028—2 pages Germany.

Ministry of Intellectual Property Office Notice for Filing Response dated Jan. 27, 2026 re Appl. No. 10-2023-7024962—3 pages Daejeon, Republic of Korea.

The State Intellectual Property Office of People's Republic of China The First Office Action re Application or Publication No. 202180091903.3—10 pages Beijing, China.

Japan Patent Office Notice of Reasons for Refusal dated Nov. 27, 2025 re Application No. 2023 to 539001—7 pages Tokyo, Japan.

* cited by examiner

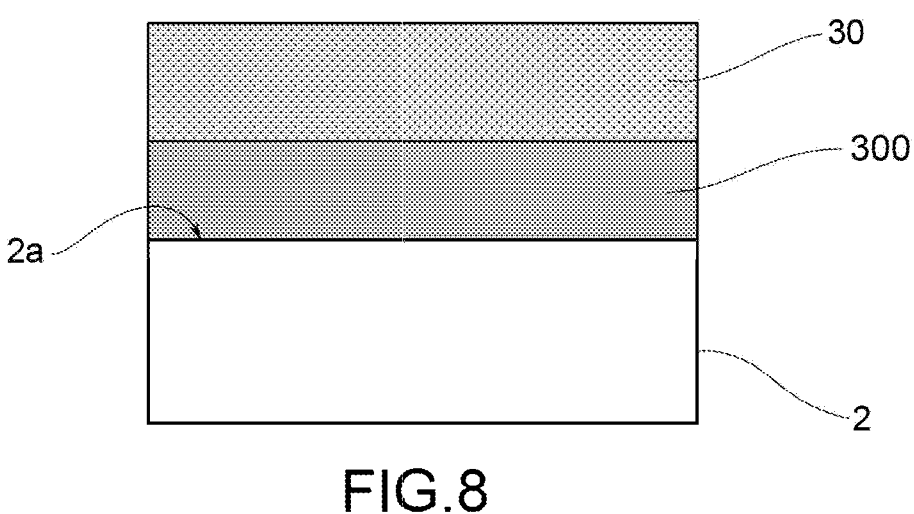
FIG.8
30
2a
300
2
FIG.9
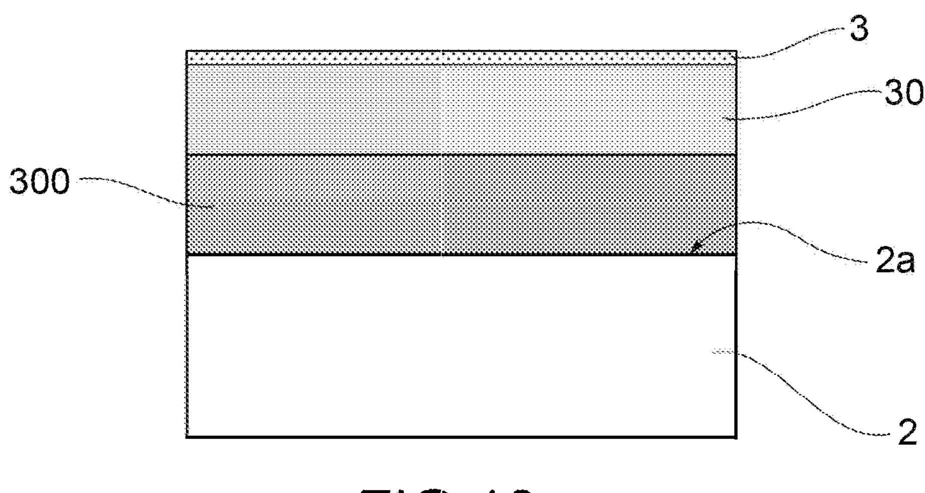
FIG.10

DOUBLE-LAYER BRAKE DISC IN NICKEL-FREE STEEL AND MANUFACTURING METHOD

FIELD

The present invention relates to a method for making a brake disc and to a brake disc for disc brakes.

BACKGROUND

A brake disc of a vehicle disc brake system comprises an annular structure, or braking band, and a central fixing element, known as a bell, by which the disc is attached to the rotating part of a vehicle suspension, for example a hub. The braking band is provided with opposite braking surfaces suitable for cooperating with friction elements (brake pads), housed in at least one gripper body placed astride of said braking band and integral with a non-rotating component of the vehicle suspension. The controlled interaction between the opposite brake pads and the opposite braking surfaces of the braking band determine by friction a braking action which allows the deceleration or stopping of the vehicle.

Generally, the brake disc is made of gray cast iron or steel. In fact, this material allows good braking performance (especially in terms of limited wear) to be obtained at relatively low costs. Discs made of carbon or carbon-ceramic materials offer much higher performance, but at a much higher cost.

The limits of traditional discs of cast iron or steel are linked to excessive wear. As far as gray cast iron discs are concerned, another very negative aspect is linked to excessive surface oxidation, with the consequent formation of rust. This aspect affects both the performance of the brake disc and its appearance, as the rust on the brake disc is aesthetically unacceptable to the user. An attempt was made to address these problems by making the discs in gray cast iron or steel with a protective coating. The protective coating serves on the one hand to reduce the wear of the disc, and on the other hand to protect the gray cast iron base from surface oxidation, thus avoiding the formation of a layer of rust. The protective coatings available today and applied on discs, although offering resistance to wear, are however subject to flaking that causes the detachment thereof from the disc itself.

A protective coating of this type is described for example in U.S. Pat. No. 4,715,486, relating to a low-wear disc brake. The disc, made in particular of cast iron, has a coating made with a particle material deposited on the disc with an impact technique with high kinetic energy. According to a first embodiment, the coating contains from 20% to 30% of tungsten carbide, 5% of nickel and the balance of a mixture of chromium and tungsten carbides.

In the case of application of the coating with flame spray techniques, a cause of the detachment of traditional protective coatings from aluminum or aluminum alloy discs is the presence of free carbon in the protective coating. This phenomenon also affects gray cast iron or steel discs.

A solution to the aforesaid problems has been proposed by the same applicant in international application WO2014/097187 as regards discs made of gray cast iron or steel. It is composed in creating a protective coating on the braking surfaces of a brake disc obtained by depositing a material in particle form composed of 70 to 95% by weight of tungsten carbide, 5% to 15% by weight of cobalt and 1% to 10% by weight of chromium. The deposition of the material in particle form is obtained by the HVOF (High Velocity Oxygen Fuel) technique, or by the HVAF (High Velocity Air Fuel) technique or by the KM (Kinetic Metallization) technique.

More in detail, according to the solution offered in WO2014/097187, the combination of the HVOF, HVAF or KM deposition technique and the chemical components used for the formation of the coating allows a protective coating with high bond strength to be obtained, which guarantees a high degree of anchoring on gray cast iron or steel. The above solution allows the flaking phenomena of the protective coating recorded in the prior art to be significantly reduced, but not to eliminate them completely. In fact, even in discs provided with a protective coating made according to WO2014/097186, peeling and sagging of the protective coating continue to occur—albeit less frequently than in the prior art.

The aforementioned flaking and sagging may contribute in particular to the release by rubbing of nickel particles, a metal which contributes significantly to sensitization phenomena in the population.

However, in the specific field of steel production for brake discs, to date, the presence of nickel is considered essential as it increases the strength of the steel and toughness. Furthermore, nickel increases the resistance of steel to oxidation and corrosion, but, above all, nickel increases the abrasive resistance of the steel and the heat resistance of that steel, aspects which are extremely relevant for the stresses they are subjected to in brake discs. Therefore, to date, the presence of nickel is considered an essential element for the production of a cast iron or steel brake disc.

Taking into account the advantages in terms of wear resistance guaranteed by the protective coatings and the simultaneous need to maintain the presence of nickel in the composition of the brake disc, the need to solve the drawbacks mentioned in reference to the prior art is very much felt in the field.

In particular, the need is felt to have gray cast iron or steel discs capable of reducing the release of nickel particles, but at the same time capable of guaranteeing adequate or equivalent thermal and mechanical performance typical of the prior art brake discs, including high wear resistance of the disc and reliability over time.

According to a further aspect, the need is also felt to make steel discs with less consumption of resources necessary for production (and therefore also of costs), while maintaining an adequate hardness of the coating and at the same time a reduced (or even absent) release of nickel particles.

SUMMARY

The need for brake discs capable of reducing the release of nickel particles, but at the same time capable of guaranteeing adequate or equivalent thermal and mechanical performance, is met by a brake disc and by a method for making a brake disc according to the appended independent claims.

DESCRIPTION OF THE FIGURES

Further features and advantages of the present invention will become more apparent from the following description of preferred and non-limiting embodiments thereof, in which:

FIG. 8 shows a sectional view of a half portion of a braking band according to a fifth embodiment of the present invention;

FIG. 9 shows a sectional view of a half portion of a braking band according to a sixth embodiment of the present invention;

FIG. 10 shows a sectional view of a half portion of a braking band according to a seventh embodiment of the present invention.

DETAILED DESCRIPTION

Figure 1:
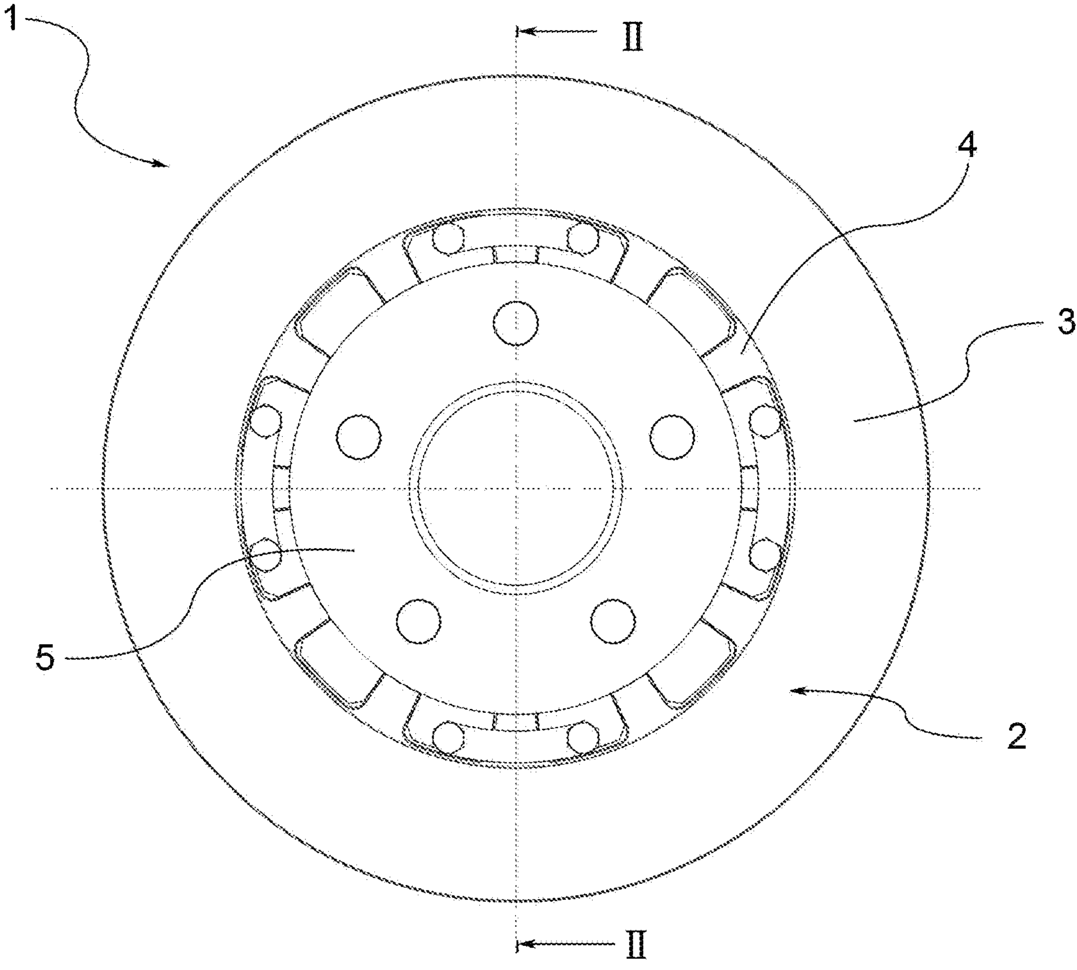
FIG. 1 shows a top plan view of a disc brake according to an embodiment of the present invention.

Elements or parts of elements common to the embodiments described hereinafter will be indicated with the same reference numerals.

With reference to the above figures, reference numeral 1 globally denotes a brake disc according to the present invention.

In the present discussion, where numerical percentage intervals are indicated, the extremes of these intervals are always understood to be included, unless otherwise specified.

According to a general embodiment of the invention, illustrated in the accompanying figures, the brake disc 1 comprises a braking band 2, provided with two opposite braking surfaces 2*a* and 2*b*, each of which at least partially defines one of the two main faces of the disc.

The braking band 2 is made of gray cast iron or steel.

Preferably, the braking band 2 is made of gray cast iron. In particular, the entire disc is made of gray cast iron. In the remainder of the description, reference will therefore be made to a gray cast iron disc, without however excluding the possibility that it is made of steel.

The disc 1 is provided with a base layer 30 which covers at least one of the two braking surfaces 2*a*, 2*b* of the braking band and is preferably made in direct contact with said braking surfaces 2*a*, 2*b*.

According to an aspect of the present invention, such base layer 30 is composed of steel having a nickel content lower than or at most equal to 15%.

According to a further aspect of the present invention, such base layer 30 is composed of steel having a nickel content lower than or at most equal to 7.5%, even more preferably lower than or at most equal to 5%.

According to a further aspect of the present invention, such base layer 30 is totally nickel-free. This allows limiting, if not even avoiding, the dispersion of nickel particles during the life of the brake disc 1.

In general, in the present discussion, when reference is made to phrases such as "nickel free" or "without nickel" or the like, it is meant exactly the total absence of nickel but also an absence of nickel less than a small amount of nickel which may be present due to traces or residual impurities due to the manufacturing process, but in any case amounts of nickel lower than 1% or possibly at the most strictly lower than 5%, for any layer.

It is clear that, to those skilled in the art, it is known what is meant when referring to percentages of content of nickel or of any other component of the steel or cast iron alloy. For example, reference is generally made to the percentage content by mass with respect to the total content of the alloy. Therefore, in the continuation of the present discussion, particular percentage calculations will be specified only where they deviate from the aforementioned definition; where not specified, the percentages indicated should be considered as understandable by those skilled in the art.

According to an embodiment of the invention, the steel of the base layer 30 is composed of 10% to 15% chromium Cr, at most 1% silicon Si, at most 4% manganese Mn, between 0.16% and 0.5% of carbon C and for the balance of iron Fe, i.e., for the remaining percentage by weight of iron. This allows obtaining a martensitic steel, without nickel content.

Preferably, the content of carbon C of the steel of the base layer is comprised between 0.16 and 0.25%.

Advantageously, the aforesaid composition allows a reduced percentage of any carbides included in the steel to be used, without reducing the hardness of any coating (described in more detail, later in the text).

According to a preferred embodiment variant, the chromium (Cr) content in the steel of the base layer 30 is comprised between 11% and 14%, extremes included.

Figure 5:
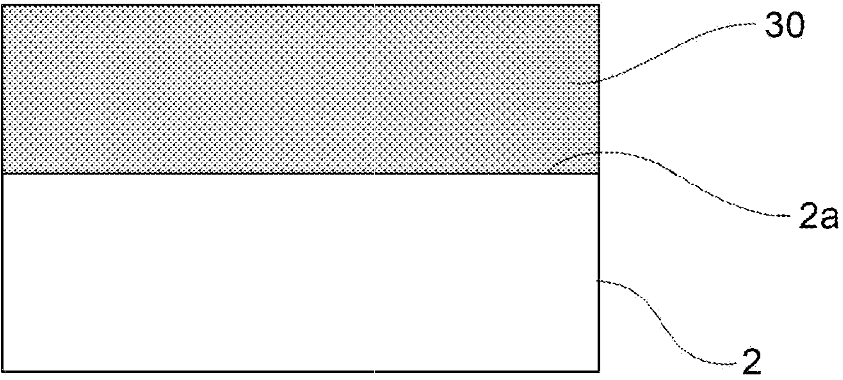
FIG. 5 shows a sectional view of a half portion of a braking band according to a second embodiment of the present invention.

According to an embodiment variant of the invention, for example shown in FIG. 5, the base layer 30 also is composed of one or more carbides included in the nickel-free steel. Such inclusion is obtained by means of techniques known to those skilled in the art of inclusion of carbides in steel, for example the carbides are dissolved in the alloy.

Preferably, the one or more carbides included comprise at least one carbide selected from the group comprising: tungsten carbide (WC), chromium carbide (preferably, but not limited to, Cr3C2), Niobium carbide (NbC), titanium carbide (TiC). It is clear that more than one carbide selected from the aforementioned group or all the carbides present in the present group may also be present.

The one or more carbides included comprise at least one carbide selected from the group comprising: tungsten carbide (WC), chromium carbide (e.g., Cr3C2), Niobium carbide (NbC), titanium carbide (TiC).

Figure 6:
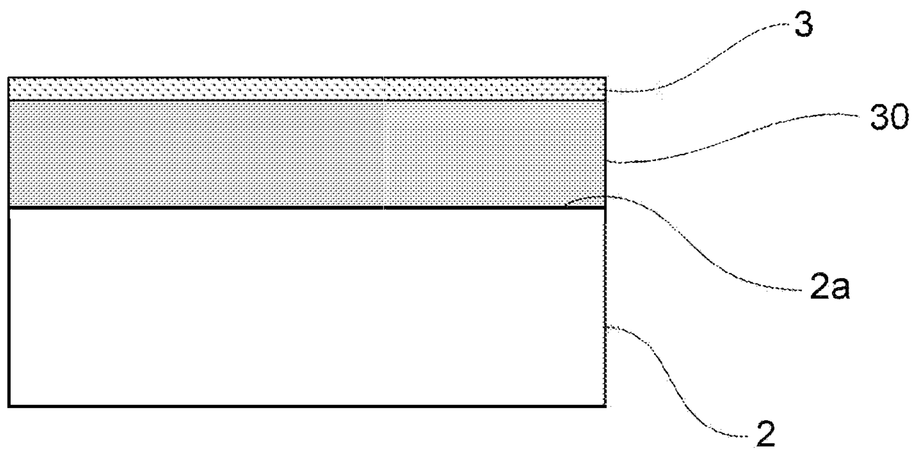
FIG. 6 shows a sectional view of a half portion of a braking band according to a third embodiment of the present invention.
Figure 7:
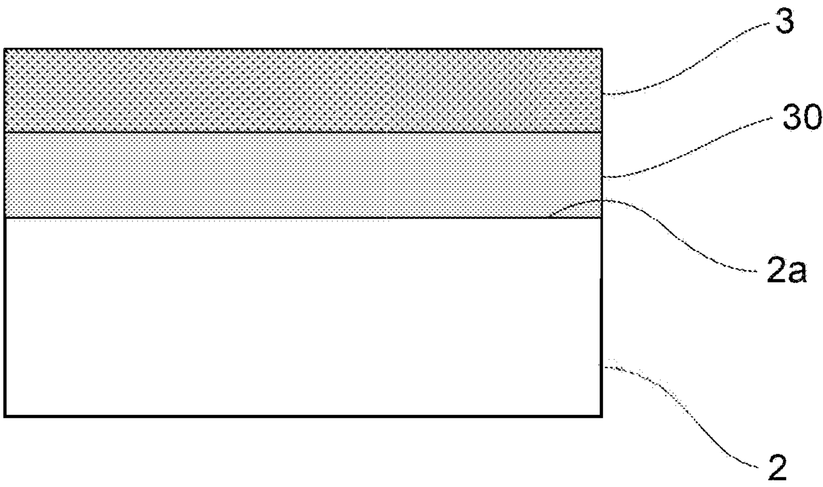
FIG. 7 shows a sectional view of a half portion of a braking band according to a fourth embodiment of the present invention.

According to an advantageous embodiment, for example shown in FIG. 6, the brake disc 1 comprises a protective surface coating 3 which covers the base layer 30 at least on the side of one of the two braking surfaces 2*a*, 2*b* of the braking band. Such protective surface coating 3 is arranged on one side of the base layer 30 which does not face towards the braking surface 2*a*, 2*b*. Furthermore, the surface protective coating 3 is composed of at least one carbide or more carbides in particle form which may be deposited by the Thermal Spray deposition technique, for example by the HVOF (High Velocity Oxy-Fuel) technique, or by the HVAF (High Velocity Air Fuel) technique or by the APS (Atmosphere plasma spray) technique or by the Cold Spray deposition technique, for example by the KM (Kinetic Metallization) technique, or by the deposition technique using a laser beam, for example by the LMD (Laser Metal Deposition) technique, or by HSLC—high speed laser cladding technique, or by EHLA—Extreme High Speed Laser Application technique, or by TSC—Top Speed Cladding technique.

The surface protective coating 3 is therefore obtained by depositing directly on the disc 1 one or more carbides in particle form also by the HVOF technique, or by the HVAF (High Velocity Air Fuel) technique or by the KM (Kinetic Metallization) technique, preferably tungsten carbide (WC) or chromium carbide (for example, Cr3C2) or niobium carbide (NbC) or titanium carbide (TiC).

According to a further embodiment variant, the surface protective coating 3 is composed of steel having a nickel content lower than or at most equal to 15% or lower or at most equal to 7.5%, or lower or at most equal at 5%, or even more preferably totally free from nickel, and of one or more carbides included in the steel. In this variant, in other words, the base layer 30 in nickel-free steel and above a protective surface coating 3 composed of the aforementioned steel and one or more carbides included in the steel are joined above the cast iron band in the order indicated.

The presence of carbides deposited on the surface or included in the steel substantially or totally without nickel allows imparting mechanical strength and wear resistance, so as to compensate for the scarcity or total lack of nickel inside the steel.

According to a variant, the surface protective coating 3 is composed of one or more of the following carbides: tungsten carbide (WC), niobium carbide (NbC), chromium carbide (for example, Cr3C2), titanium carbide (TiC). Preferably, such protective surface coating 3 is obtained by depositing on the base layer 30 one or more of the aforementioned carbides in particle form by the Thermal Spray deposition technique, for example by the HVOF (High Velocity Oxy-Fuel) technique, or by the HVAF (High Velocity Air Fuel) technique or by the APS (Atmosphere plasma spray) technique or by the Cold Spray deposition technique, for example by the KM (Kinetic Metallization) technique, or by the deposition technique using a laser beam, for example by the LMD (Laser Metal Deposition) technique, or by HSLC—high speed laser cladding technique, or by EHLA—Extreme High Speed Laser Application technique, or by TSC—Top Speed Cladding technique. It is therefore clear that more than one carbide selected from the aforementioned group or all the carbides present in the present group may also be present.

According to an advantageous embodiment, the surface protective coating 3 is composed of chromium carbide (for example, Cr3C2) and titanium carbide (TiC).

According to a variant, the surface protective coating 3 is composed of at least one metal oxide or a mixture of metal oxides or a mixture of metals and ceramic materials, preferably a mixture of aluminum oxides Al2O3, or a mixture of Al2O3 and intermetallic matrix Fe—Cr, for example Fe28Cr.

According to an advantageous embodiment variant, the surface protective coating 3 is composed of one or more of the following carbides: tungsten carbide (WC), niobium carbide (NbC), chromium carbide (for example, Cr3C2), titanium (TiC), mixed with a mixture of metal oxides or mixed with a mixture of metals and ceramic materials, preferably with a mixture of aluminum oxides Al2O3, or a mixture of Al2O3 and intermetallic matrix Fe—Cr, for example Fe28Cr.

It is clear that the oxides or mixtures of oxides, or the metals or mixtures of metals and ceramic materials, or the mixtures of carbides and metal oxides described above are preferably deposited by the same deposition techniques of the carbides in particle form described above and in the present discussion.

Preferably, the surface protective coating 3 has a thickness comprised between 30 μm and 150 μm, and preferably between 50 μm and 90 μm.

According to an embodiment of the present invention, the steel of the base layer 30 comprises between 10% and 20% of chromium (Cr).

According to an embodiment of the present invention, the steel of the base layer 30 comprises at least 15% chromium (Cr), even more preferably between 16% and 18% chromium.

According to an embodiment, the steel of the base layer 30 comprises at most 5% manganese (Mn), even more preferably, the manganese content is between 0.5% and 5%, extremes included, so as to at least partially compensate for the lack of the properties of the steel alloy generally imparted by the presence of nickel, increasing the mechanical strength.

In particular, according to an embodiment, in order to compensate for the scarce quantity or complete absence of nickel and to obtain adequate performances for a brake disc, the steel of the base layer 30 is composed of 10 to 20% of Chromium (Cr) by weight, preferably between 16% to 18% of chromium (Cr) by weight, at most 1.5% by weight of silicon (Si), at most 2% by weight of manganese (Mn), at most 0.03% by weight of carbon (C) and for the balance iron (Fe), i.e. for the remaining percentage by weight of iron.

Preferably, the base layer 30 has a thickness comprised between 20 μm and 300 μm, and preferably equal to 90 μm.

According to a variant of the invention, in order to compensate for the low quantity or complete absence of nickel and to obtain adequate performance for a brake disc, the steel of the base layer 30 has a molybdenum content between 0.5% and 10%, even more preferably between 0.5% and 4.5%, extremes included and a manganese content between 0.5% and 5%. The presence of molybdenum and manganese in the above percentages allows adequate resistance to corrosion and at the same time adequate mechanical resistance to be obtained.

According to an embodiment, between the base layer 30 and at least one of the two braking surfaces 2*a*, 2*b* of the braking band 2 there is interposed an intermediate layer 300 of steel comprising nickel, preferably with a nickel content higher than 5% in the case in which the base layer 30 is totally free from nickel, or, even more preferably with a nickel content of at least 5%, and even more preferably with a nickel content of at least 5% and less than 15%.

According to an embodiment, the intermediate layer 300 comprises a steel with a nickel content of at most 15% or equal to 15%.

According to an embodiment, the intermediate layer 300 comprises a steel with a nickel content of at most 7.5% or equal to 7.5%.

According to a further embodiment, an intermediate layer 300 of nickel-free steel is interposed between the base layer 30 and at least one of the two braking surfaces 2*a*, 2*b* of the braking band.

According to an embodiment, the intermediate layer 300 comprises a nickel-free steel composed of 10% to 15% of chromium (Cr), at most 1% of silicon (Si), at most 4% of manganese (Mn), from 0.16% to 0.5% of carbon (C) and for the balance iron (Fe). Preferably, the carbon (C) content is comprised between 0.16% and 0.25%.

The presence of the intermediate layer 300 allows a disc with adequate mechanical features to be obtained, but at the same time with a reduced environmental impact, by virtue of the presence of the base layer 30.

According to an embodiment, the intermediate layer 300 comprises steel composed of 10% to 15% of chromium (Cr), at most 1% of silicon (Si), at most 4% of manganese (Mn), from 0.16% to 0.5% of carbon (C) and for the balance iron (Fe). Preferably, the carbon (C) content of the steel of the intermediate layer 300 is comprised between 0.16% and 0.25%, extremes included.

According to an embodiment, the surface protective coating 3 comprises steel composed of 10% to 15% of chromium (Cr), at most 1% of silicon (Si), at most 4% of manganese (Mn), between 0.16% and 0.5% of carbon (C) and for the balance iron (Fe), preferably without nickel.

Preferably, the carbon (C) content of the steel of the surface protective coating is comprised between 0.16% and 0.25%, extremes included.

According to an embodiment, an auxiliary layer of ferritic-nitrocarburization or an auxiliary ferroalumination layer is interposed between one of the two braking surfaces 2*a*, 2*b* of the braking band and the base layer 30, or between one of the two braking surfaces 2*a*, 2*b* of the braking band and the intermediate layer 300, or between the base layer 30 and the surface protective coating 3, or between the intermediate layer 300 and the base layer 30.

According to an embodiment, an auxiliary layer of ferritic-nitrocarburization and an auxiliary ferroalumination layer is interposed between one of the two braking surfaces 2*a*, 2*b* of the braking band and the base layer 30, or between one of the two braking surfaces 2*a*, 2*b* of the braking band and the intermediate layer 300, or between the base layer 30 and the surface protective coating 3, or between the intermediate layer 300 and the base layer 30.

For simplicity of discussion, the brake disc 1 will now be described contextually to the method according to the present invention. The brake disc 1 is preferably, but not necessarily, made by the method according to the invention which will now be described.

According to a first aspect of the present invention, a general embodiment of the method according to the invention comprises the following operating steps:

a) preparing a brake disc, comprising a braking band and provided with two opposite braking surfaces 2*a*, 2*b*, each of which defines at least partially one of the two main faces of the disc, the braking band being made of gray cast iron or steel;

b) depositing a steel layer comprising at most 15% of nickel, preferably by laser deposition technique, for example Laser Metal Deposition or Extreme High-Speed Laser Material Deposition or by Thermal Spray deposition technique, or by Cold Spray deposition technique, to form the base layer 30;

c) optionally depositing over said base layer 30 a material in particle form composed of tungsten carbide (WC) or niobium carbide (NbC) or titanium carbide (TiC) or possibly chromium carbide by a Thermal Spray deposition technique, e.g. by the HVOF (High-Velocity Oxy-Fuel) technique, the HVAF (High-Velocity Air Fuel) technique, the APS (Atmosphere Plasma Spray) technique or a Cold Spray deposition technique, e.g. by the KM (Kinetic Metallization) technique, or by a laser beam deposition technique, e.g. by the LMD (Laser Metal Deposition) technique, or by the HSLC (High-Speed Laser Cladding) technique, or by the EHLA (Extreme High-Speed Laser Application) technique, or by the TSC (Top Speed Cladding) technique, forming a protective surface coating 3 which covers at least one of the two braking surfaces of the braking band, for example which covers the base layer 30, preferably at least for the entire surface of one of the two braking surfaces 2*a*, 2*b* of the braking band.

According to a second aspect of the present invention, in a further general embodiment of the method according to the invention comprises the following operating steps:

a) preparing a brake disc, comprising a braking band and provided with two opposite braking surfaces 2*a*, 2*b*, each of which defines at least partially one of the two main faces of the disc, the braking band being made of gray cast iron or steel;

b) depositing a steel layer completely free from nickel, preferably by laser deposition technique, for example Laser Metal Deposition or Extreme High-Speed Laser Material Deposition or by Thermal Spray deposition technique, or by Cold Spray deposition technique, to form the base layer 30;

c) optionally depositing over said base layer 30 a material in particle form composed of tungsten carbide (WC) or niobium carbide (NbC) or titanium carbide (TiC) or possibly chromium carbide by a Thermal Spray deposition technique, e.g. by the HVOF (High-Velocity Oxy-Fuel) technique, the HVAF (High-Velocity Air Fuel) technique, the APS (Atmosphere Plasma Spray) technique or a Cold Spray deposition technique, e.g. by the KM (Kinetic Metallization) technique, or by a laser beam deposition technique, e.g. by the LMD (Laser Metal Deposition) technique, or by the HSLC (High-Speed Laser Cladding) technique, or by the EHLA (Extreme High-Speed Laser Application) technique, or by the TSC (Top Speed Cladding) technique, forming a protective surface coating 3 which covers at least one of the two braking surfaces of the braking band, for example which covers the base layer 30, preferably at least for the entire surface of one of the two braking surfaces 2*a*, 2*b* of the braking band.

According to a third aspect of the present invention, in a further general embodiment of the method according to the invention comprises the following operating steps:

a) preparing a brake disc, comprising a braking band and provided with two opposite braking surfaces 2*a*, 2*b*, each of which defines at least partially one of the two main faces of the disc, the braking band being made of gray cast iron or steel;

a1) after step a), depositing on at least one of the two opposite braking surfaces 2*a*, 2*b*, an intermediate layer 300 composed of nickel-free steel;

b) after step a1), depositing a steel layer completely free from nickel, preferably by laser deposition technique, for example Laser Metal Deposition or Extreme High-Speed Laser Material Deposition or by Thermal Spray deposition technique, or by Cold Spray deposition technique, to form the base layer 30;

c) optionally depositing over said base layer 30 a material in particle form composed of tungsten carbide (WC) or niobium carbide (NbC) or titanium carbide (TiC) or possibly chromium carbide by a Thermal Spray deposition technique, e.g. by the HVOF (High-Velocity Oxy-Fuel) technique, the HVAF (High-Velocity Air Fuel) technique, the APS (Atmosphere Plasma Spray) technique or a Cold Spray deposition technique, e.g. by the KM (Kinetic Metallization) technique, or by a laser beam deposition technique, e.g. by the LMD (Laser Metal Deposition) technique, or by the HSLC (High-Speed Laser Cladding) technique, or by the EHLA (Extreme High-Speed Laser Application) technique, or by the TSC (Top Speed Cladding) technique, forming a protective surface coating 3 which covers at least one of the two braking surfaces of the braking band, for example which covers the base layer 30, preferably at least for the entire surface of one of the two braking surfaces 2*a*, 2*b* of the braking band.

According to an embodiment, step a1) provides for depositing an intermediate layer 300 composed of nickel-free steel and from 10% to 15% of chromium (Cr), at most 1% of silicon (Si), at most 4% of manganese (Mn), from to 0.5% of carbon (C), preferably from 0.16% to 0.25% of carbon (C), extremes included, and for the balance of iron (Fe). According to a further aspect of the present invention, in a further general embodiment of the method according to the invention comprises the following operating steps:

a) preparing a brake disc 1, comprising a braking band 2 provided with two opposite braking surfaces 2*a*, 2*b*, each of which defines at least partially one of the two main faces of the disc, the braking band being made of gray cast iron or steel;

b) depositing a base layer 30 composed of steel totally free from nickel and from 10% to 15% of chromium (Cr), at most 1% of silicon (Si), at most 4% of manganese (Mn), from 0.16% to 0.5% of carbon (C), preferably from 0.16% to and for the balance iron (Fe).

According to a further aspect of the present invention, a general embodiment of the method according to the invention comprises the following operating steps:

a) preparing a brake disc, comprising a braking band and provided with two opposite braking surfaces 2*a*, 2*b*, each of which defines at least partially one of the two main faces of the disc, the braking band being made of gray cast iron or steel;

a1) after step a), depositing on at least one of the two opposite braking surfaces 2*a*, 2*b*, an intermediate layer 300 composed of steel comprising nickel, preferably according to the features described in the previous paragraphs of the present discussion;

b) after step a1), depositing a steel layer completely free from nickel, preferably by laser deposition technique, for example Laser Metal Deposition or Extreme High-Speed Laser Material Deposition or by Thermal Spray deposition technique, or by Cold Spray deposition technique, to form the base layer 30;

c) optionally depositing over said base layer 30 a material in particle form composed of tungsten carbide (WC) or niobium carbide (NbC) or titanium carbide (TiC) or possibly chromium carbide by a Thermal Spray deposition technique, e.g. by the HVOF (High-Velocity Oxy-Fuel) technique, the HVAF (High Velocity Oxy-Fuel) technique, the APS (Atmosphere Plasma Spray) technique or a Cold Spray deposition technique, e.g. by the KM (Kinetic Metallization) technique, or by a laser beam deposition technique, e.g. by the LMD (Laser Metal Deposition) technique, or by the HSLC (High-Speed Laser Cladding) technique, or by the EHLA (Extreme High-Speed Laser Application) technique, or by the TSC (Top Speed Cladding) technique, forming a protective surface coating 3 which covers at least one of the two braking surfaces of the braking band, for example which covers the base layer 30, preferably at least for the entire surface of one of the two braking surfaces 2*a*, 2*b* of the braking band.

In addition to the aforementioned general embodiment variants of the method according to the present invention, the method preferably provides for the further steps which will be described below.

Preferably, in step c) the tungsten carbide (WC) or the niobium carbide (NbC) or the titanium carbide (TiC) or possibly the chromium carbide is dispersed in a metal matrix.

According to a preferred embodiment, in step c), the material in particle form is composed of chromium carbide and titanium carbide.

Advantageously, the brake disc is arranged with a portion suitable for fixing the disc to a vehicle, composed of an annular portion 4 arranged centrally to the disc 1 and concentric to the braking band 2. The fixing portion 4 supports the connecting element 5 to the wheel hub (i.e. the bell). The bell may be made in one piece with the annular fixing portion (as illustrated in the accompanying figures) or it may be made separately and, therefore, fixed through suitable connecting elements to the fixing portion.

The annular fixing portion 4 may be made of the same material as the braking band, that is, of gray cast iron, or of another suitable material. The bell 5 may also be made of gray cast iron or of another suitable material. In particular, the whole disc (i.e. braking band, fixing portion and bell) may be made of gray cast iron.

Preferably, the braking band 2 is made by casting. Similarly, when made of gray cast iron, the fixing portion and/or the bell may be made by casting.

The annular fixing portion may be made in a single body with the braking band (as illustrated in the accompanying figures) or be made as a separate body, mechanically connected to the braking band.

As regards the HVOF, HVAF or KM, or LMD or HSLC techniques, these are three deposition techniques which are known to those skilled in the art and will therefore not be described in detail.

HVOF (High Velocity Oxygen Fuel) is a powder spray deposition technique which uses a spray device provided with a mixing and combustion chamber and a spray nozzle. The chamber is supplied with oxygen and fuel. The hot combustion gas which forms at pressures close to 1 MPA passes through the converging-diverging nozzle into the powdered material reaching hypersonic speeds (i.e. higher than MACH 1). The powder material to be deposited is injected into the hot gas stream, where it melts rapidly and is accelerated to speeds of the order of 1000 m/s. Once impacted on the deposition surface, the molten material cools rapidly and due to the impact with high kinetic energy it forms a very dense and compact structure.

The High Velocity Air Fuel (HVAF) deposition technique is similar to the HVOF technique. The difference is that in the HVAF technique the combustion chamber is fed with air instead of oxygen. The temperatures involved are therefore lower than those of the HVOF. This allows for greater control of the thermal alteration of the coating.

The KM (Kinetic Metallization) deposition technique is a solid-state deposition process in which metal powders are sprayed through a two-phase sonic deposition nozzle which accelerates and triboelectrically charges metal particles within an inert gas stream. Thermal energy is expected to be supplied to the transport stream. The process transforms the potential energy of the compressed inert gas stream and the thermal energy supplied into the kinetic energy of the powders. Once accelerated to high speed and electrically charged, the particles are directed against the deposition surface. The high-speed collision of the metal particles with this surface causes a large deformation of the particles (approximately 80% in the direction normal to impact). This deformation results in a huge increase in the surface area of the particles. Upon impact, the effect is therefore intimate contact between the particles and the deposition surface, which leads to the formation of metal bonds and a coating having a very dense and compact structure.

Advantageously, as an alternative to the three deposition techniques listed above, which share the fact that they are high kinetic energy impact deposition techniques, other techniques may also be used which exploit different deposition methods, but which are able to generate coatings having a very dense and compact structure.

The combination of the HVOF or HVAF or KM or LMD or HSLC deposition technique and the chemical components used for the formation of the base layer 30 and the surface protective coating 3, allows both high bond strength on the lower material on which they are deposited and the deposition of powders with high carbide content to be obtained.

As already mentioned above, the base layer 30 and the protective surface coating 3 cover at least one of the two braking surfaces of the braking band.

Hereinafter, the term "coating" will refer to both the set given by the base layer 30 and the protective surface coating 3, and to the base layer 30 alone, in the variant which does not provide for the surface protective coating 3, but which provides for the inclusion of carbides in the base layer 3.

Figure 2:
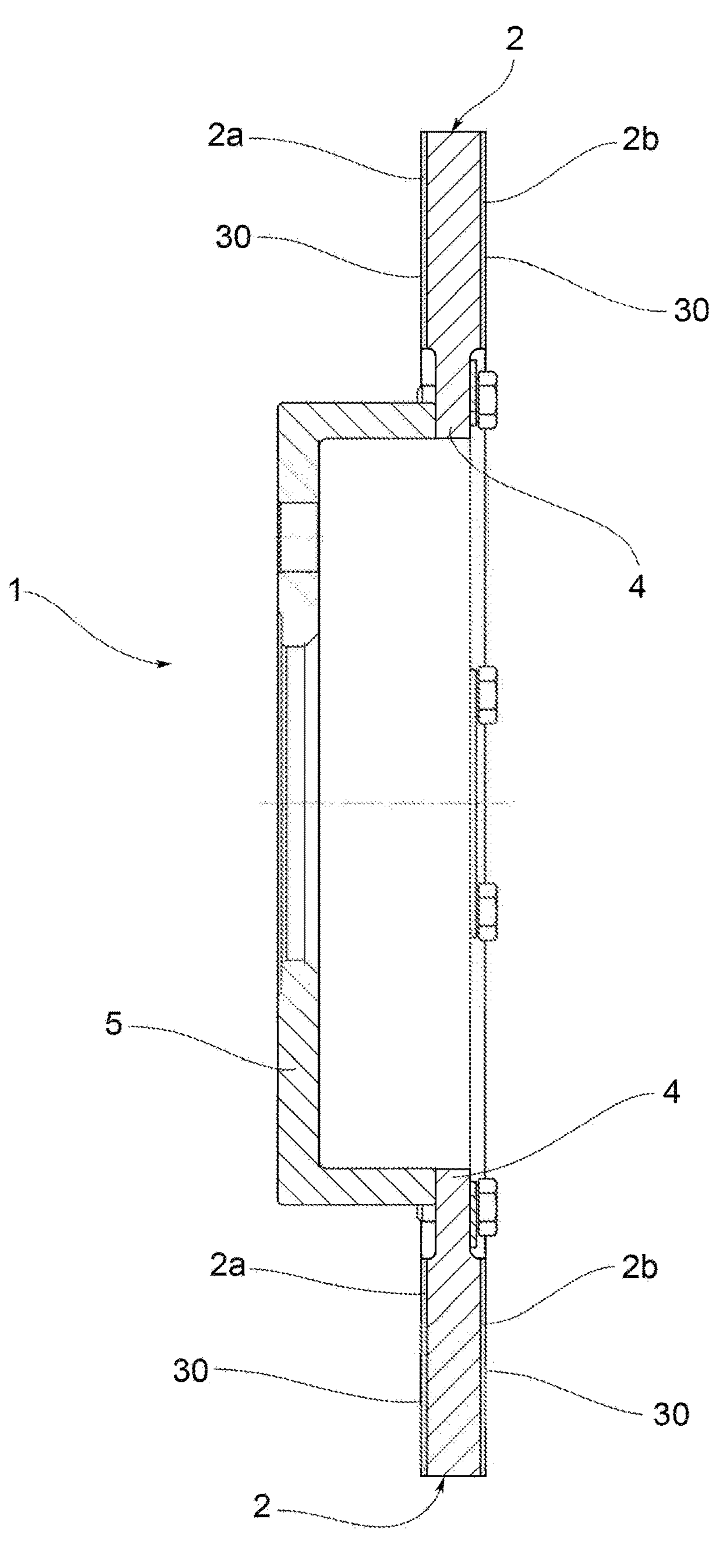
FIG. 2 shows a sectional view of the disc of FIG. 1 according to the section line II-II indicated therein, according to an embodiment of the present invention.
Figure 3:
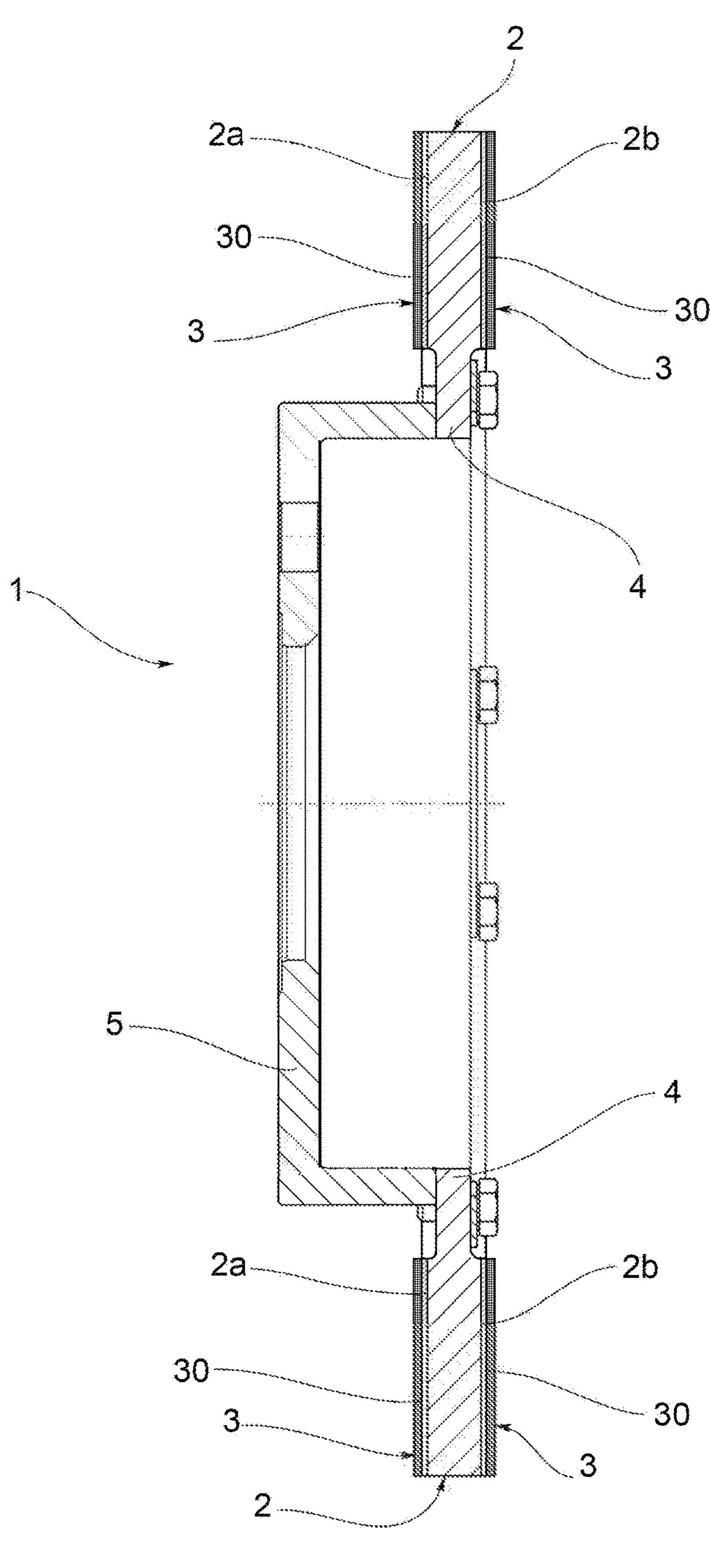
FIG. 3 shows a sectional view of the disc of FIG. 1 according to the section line II-II indicated therein, according to a further embodiment of the present invention.
Figure 4:
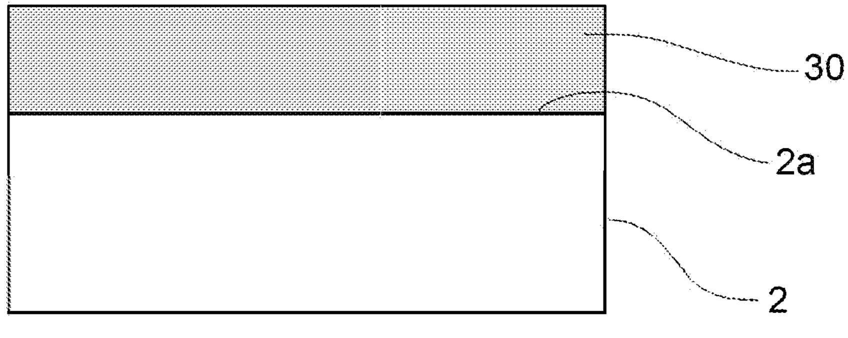
FIG. 4 shows a sectional view of a half portion of a braking band according to an embodiment of the present invention.

Preferably, as illustrated in FIG. 2 and FIG. 3, the disc 1 is provided with a coating 3, 30 which covers both the braking surfaces 2*a* and 2*b* of the braking band 2.

In particular, the coating 3, 30 may cover only the braking band, on a single braking surface or on both.

According to embodiments not illustrated in the appended figures, the coating 3, 30 may also extend to other parts of the disc 1 such as the annular fixing portion 4 and the bell 5, up to cover the entire surface of the disc 1. In particular, the coating 3, 30 may cover—in addition to the braking band—only the fixing portion or only the bell. The choice is dictated by essentially aesthetic reasons, in order to have a homogeneous coloring and/or finish on the whole disc or between some portions thereof.

Advantageously, the deposition of the particulate material for the formation of the coating 3, 30 may be carried out in a differentiated manner on the surface of the disc at least in terms of thickness of the coating.

At the braking band, the coating 3, 30 may be made with the same thickness in the two opposite braking surfaces. Alternative solutions may be provided in which the coating 3, 30 is made by differentiating the different thicknesses between the two braking surfaces of the braking band.

According to an embodiment of the method, the step b) of depositing the base layer 30 provides for depositing a composition in particle form composed of steel having a nickel content of at most 15% or at most 7.5% or at most 5% or totally nickel-free steel, by laser deposition technique, preferably LMD (Laser Metal Deposition) or EHLA (Extreme High-Speed Laser Material Deposition), or by Thermal Spray deposition technique, or by the Cold Spray deposition technique.

In an advantageous embodiment, in step b) the composition in particle form further comprises carbides mixed in a percentage not exceeding 50% by weight of the total particulate composition.

In an advantageous embodiment, in step b) the composition in particle form, in addition to steel, also includes metal oxides or a mixture of metals and ceramic materials, preferably a mixture of aluminum oxides Al2O3, or a mixture of Al2O3 and intermetallic matrix Fe—Cr, for example Fe28Cr.

According to an embodiment, in step b) the composition in particle form, in addition to steel, also includes metal oxides or a mixture of metals and ceramic materials, preferably a mixture of aluminum oxides Al2O3, or a mixture of Al2O3 and intermetallic matrix Fe—Cr, for example Fe28Cr, and also one or more carbides selected from the group comprising: tungsten carbide (WC), niobium carbide (NbC), titanium carbide (TiC), chromium carbide.

It is therefore clear that, by virtue of the aforementioned variants of the method, it is possible to obtain a braking band 2 in which the base layer 30 comprises a mixture of steel and metal oxides described above, or, in another variant, a mixture of steel and metal oxides and carbides described above.

The preferred embodiment variants of the braking band and the arrangement order of the base layer 30, of the intermediate layer 300 and of the surface coating layer 3, are also more understandable with reference to the appended figures.

Preferably, the step a1) of depositing the intermediate layer 300 provides for depositing a composition in particle form composed of steel having a nickel content between 5% and 15%, by means of a laser deposition technique, preferably LMD (Laser Metal Deposition) or EHLA (Extreme High-Speed Laser Material Deposition), or by the Thermal Spray deposition technique, or by the Cold Spray deposition technique.

According to an advantageous embodiment variant of the method, the step e1) is provided of depositing an auxiliary layer of ferritic-nitrocarburization between one of the two braking surfaces 2*a*, 2*b* of the braking band and the base layer 30, and/or between one of the two braking surfaces 2*a*, 2*b* of the braking band and the intermediate layer 300, and/or between the base layer 30 and the protective surface coating 3, and/or between the intermediate layer 300 and the base layer 30.

According to an advantageous embodiment, the method comprises the step e2) of depositing an auxiliary ferroalumination layer between one of the two braking surfaces 2*a*, 2*b* of the braking band and the base layer 30, and/or between one of the two braking surfaces 2*a*, 2*b* of the braking band and the intermediate layer 300, and/or between the base layer 30 and the protective surface coating 3, and/or between the intermediate layer 300 and the base layer 30.

Preferably, the ferroalumination step e2) comprises the steps of:

e21) immersing at least partially said braking band 2 into molten aluminum maintained at a predetermined temperature so that the molten aluminum covers at least a predetermined surface region of said braking band 2, said immersion being protracted for a predetermined period of time to allow the diffusion of aluminum atoms into the surface microstructure of said cast iron or steel with the consequent formation of ferroaluminum intermetallic compounds in a surface layer of said braking band 2, thus generating a layer comprising of ferroaluminum intermetallic compounds in said predetermined surface region of said braking band 2;

e22) removing said braking band 2 from the molten aluminum;

e23) removing the aluminum remaining on said braking band 2 after extraction, so as to expose said layer of ferroaluminum intermetallic compounds on the surface.

The layer of ferroaluminum intermetallic compounds exposed on the surface imparts a superior resistance to corrosion and wear at said predetermined surface region to the braking band 2 made of cast iron or steel.

Preferably, the layer of ferroaluminum intermetallic compounds comprises FeAl3 as the prevailing phase of the ferroaluminum intermetallic compounds.

According to an advantageous embodiment, the predefined temperature at which the molten aluminum is maintained is not higher than 750° C., and is preferably between 690° C. and 710° C., and even more preferably equal to 700° C.

According to an advantageous aspect of the method, the predefined period of immersion time is determined according to the thickness to be obtained for said layer of intermetallic compounds, at the same temperature of the molten aluminum said thickness increasing as the immersion time increases, with the same immersion time, said thickness increasing as the temperature of the molten aluminum increases, preferably said predefined immersion time being between 5 and 60 min, and even more preferably equal to 30 min.

According to an advantageous aspect, before the immersion step e21), the method comprises a step f) of decarburizing said predefined surface region of said braking band 2 up to a predefined depth.

It has been experimentally verified that the presence of carbon in the surface layer of the braking band subject to penetration by diffusion of aluminum atoms (induced by aluminization) also leads to the formation of iron carbide as well as intermetallic compounds. The presence of iron carbide creates points of discontinuity in the layer of intermetallic compounds, points which may trigger both corrosive phenomena and cracks. Advantageously, the surface decarburization therefore allows avoiding (or at least significantly reducing) the formation of iron carbide, leading to the formation of a layer of intermetallic compounds more resistant to corrosion and less subject to cracking.

Preferably, in said step f) the decarburization of said at least one predefined surface region is carried out by means of an electrolytic process.

More in detail, said electrolytic process is carried out by immersing the predefined surface region of said braking band in a bath of molten salts and applying an electric potential difference between the bath and the braking band.

In applying the electric potential difference, the braking band is connected to a positive pole (cathode), while the aforementioned bath of molten salts is connected to a negative pole (anode). Carbon, particularly in the form of graphite flakes, is oxidized to carbon dioxide by the release of electrons and atomic oxygen released at the anode. Carbon reacts primarily with oxygen and is eventually bound as carbon dioxide.

The oxidation of the surface of the braking band induced by the electrolytic process is not limited to the carbon present therein, but also extends to the metal matrix of the cast iron (iron), causing the formation of a surface film of metal oxide. Reversing the polarity causes the reduction of the surface film of metal oxide which is thus returned to the original metallic state.

Preferably, the aforementioned electrolytic process may therefore provide that, after a predefined period of time in which the surface of the braking band has been connected to the cathode to oxidize the carbon, the polarity is reversed so as to return the metal oxide film to its original metallic state.

Operationally, the decarburization depth is controlled by adjusting the duration of the electrolytic process, possibly divided into different polarity inversion cycles. By increasing the duration of the decarburization process (oxidation phase of the braking band; connection to the cathode), the decarburization depth increases, all other conditions being equal.

The decarburization may be carried out with alternative processes to the electrolytic process described above, for example by means of a laser treatment or a chemical treatment.

Decarburization by electrolytic process is however preferred because:

- compared to a laser treatment it is much more efficient and rapid, ensuring a more complete and uniform carbon removal in less time;
- compared to a chemical treatment (for example with potassium permanganate) it is much more efficient (ensuring a more complete and uniform carbon removal in less time) and does not leave oxidation areas of the metal matrix of the cast iron on the treated portion.

More in detail, it has been observed that at the oxidized areas on the metal matrix of the cast iron the wettability of the molten aluminum is very low and this negatively affects the aluminization process and the features of the layer of intermetallic compounds. Also for this reason, the electrolytic decarburization process is preferred over the alternative processes indicated above.

As has already been pointed out above, the growth thickness of the intermetallic compound layer is mainly influenced by the temperature of the molten aluminum and the immersion time in the molten aluminum. However, it has been found that a further factor affecting the thickness of the intermetallic compound layer is the silicon content in the molten aluminum. The higher the weight content of silicon in the molten aluminum, the lower the thickness of the intermetallic compound layer under the same conditions. Preferably, the molten aluminum has a silicon content lower than 1% by weight.

Preferably, the molten aluminum has an impurity content not higher than 1% by weight. In particular, aluminum with a maximum purity of 99.7% by weight may be used, with the following impurities (% by weight): Si≤0.30%; Fe≤0.18%; Sr≤0.0010%; Na≤0.0025%; Li≤0.0005%; Ca≤0.0020%; P≤0.0020; Sn≤0.020%.

In some cases it has occurred that, despite having subjected the braking band to decarburization and therefore eliminated the graphite flakes from a surface layer at which the layer of intermetallic compounds would have formed, the resulting layer of intermetallic compounds still included graphite flakes, as if they had never been eliminated. This phenomenon may be explained by the fact that the dissolution of the iron in the aluminum is so rapid that the decarburized layer is rapidly consumed and consequently the metal compounds are formed in the layer below the decarburized layer, i.e. where there are graphite flakes.

In other words, the excessive solubility of iron in molten aluminum may totally or partially cancel the beneficial effects of the surface decarburization of the braking surface.

Advantageously, in order to slow down the dissolution of the iron in the aluminum bath, the step b1) of immersion in a bath of molten aluminum in which iron has been dissolved may be carried out. In this way, by inhibiting the dissolution of the iron in the aluminum, the formation of FeAl3 is kinematically promoted, so as to allow the intermetallic compounds to form at the decarburized layer.

Preferably, the iron content in solution in the aluminum bath is not higher than 5% by weight, and even more preferably it is comprised between 3% and 5%, and most preferably equal to 4% by weight to ensure a significant effect of slowing of the melting process of the iron of the cast iron in the aluminum.

For example, an aluminum bath having the following composition (% by weight) may be used: Al≤97%; Fe 3-5%; with the following impurities: Si≤0.30%; Fe≤0.18%; Sr≤0.0010%; Na≤0.0025%; Li≤0.0005%; Ca≤0.0020%; P≤0.0020; Sn≤0.020%.

It has been experimentally observed that by carrying out aluminization with an aluminum bath with iron in solution, especially if the iron content is close to the solubility limit, more porous layers of intermetallic compounds are obtained. This may be explained by a higher viscosity of the molten aluminum bath containing iron and a consequent reduction of its wettability with respect to cast iron.

Advantageously, in order to form a layer of intermetallic compounds that is compact and uniform and therefore not very porous, while avoiding at the same time that this layer develops below the decarburized layer and incorporates the graphite flakes present therein, the aforementioned step b1) of immersion is carried out in two sub-steps:

- a first sub-step b11) of immersion in a first bath of molten aluminum, substantially free of iron in solution (or at least present at most as an impurity; for example with an iron content lower than 0.20% by weight), to obtain on said predefined surface region an initial layer composed of ferroaluminum intermetallic compounds; and
- a second sub-step b12) of immersion in a second bath of molten aluminum, containing iron in solution, to increase said initial layer until a final layer is obtained on said predefined surface region composed of ferroaluminum intermetallic compounds having a predefined thickness.

The immersion time of said braking band in said first bath is less than the immersion time of said braking band in said second bath.

Preferably, the immersion of said braking band in said first bath is continued for a period of time as short as possible, but sufficient to obtain on said predefined surface region an initial layer composed of ferroaluminum intermetallic compounds having a thickness not exceeding at 10 μm. In particular, the immersion time in said first bath is between 3 and 5 minutes if the first bath is at a temperature of about 700° C. As the bath temperature increases, the immersion time must decrease.

More in detail, for the same temperature of the second bath, said thickness increases as the immersion time increases and for the same immersion time, said thickness increases as the temperature of the second bath increases.

Advantageously, both said first bath of molten aluminum and said second bath have an impurity content not higher than 1% by weight. In particular, said two molten aluminum baths have a silicon content lower than 1% by weight.

Preferably, the iron content in solution in the second aluminum bath is not higher than 5% by weight (at 700° C. the solubility limit of iron in aluminum is 4% by weight; aluminum saturated with iron), and even more preferably it is comprised between 3% and 5%, and most preferably it is equal to 4% by weight. The iron content should not be less than 3% to ensure a significant slowing effect of the melting process of the iron of the cast iron in the aluminum.

Advantageously, both said first bath and said second bath are maintained at a temperature lower than 680° C., preferably not higher than 750° C., more preferably between 690° C. and 710° C., and even more preferably equal to 700° C.

Advantageously, the method may comprise a step of surface pretreatment of the braking band which is carried out before said immersion step e21) at least at said predefined surface region. Preferably, said surface pretreatment step comprises lapping, degreasing, sandblasting and/or chemical removal of the surface oxides.

Preferably, the method comprises a step of removing a surface layer of oxides from the molten aluminum bath before said immersion step e21). This step of removal of the surface oxides is carried out both in the case in which immersion in a single bath is contemplated, and in the case in which immersion is contemplated in two successive steps in a first and in a second bath.

According to a preferred embodiment of the invention, the step of removing the aluminum remaining adhered to said braking band after the extraction is carried out in two sub-steps:

- a first sub-step of removal is carried out on the braking band just extracted from the molten aluminum to remove the molten aluminum still remaining adhered to the braking band; and
- a second removal sub-step is carried out on the braking band extracted from the molten aluminum and cooled to remove the solidified residual aluminum remaining after said first removal sub-step.

Preferably, the method comprises a quenching step of said braking band carried out between said first removal sub-step and said second removal sub-step.

Advantageously, said first removal sub-step may be carried out by mechanical shaving of the still liquid aluminum.

Advantageously, said second removal sub-step may be carried out by chemical removal of the solidified aluminum not removed mechanically.

Preferably, the aforementioned chemical removal is carried out by exposing the aluminum to ferric chloride for at least 4 minutes so as to cause the following reaction:

$$Al+FeCl3 \rightarrow AlCl3+Fe$$

Chemical removal by ferric chloride should necessarily take place after the solidification of the aluminum. Ferric chloride boils at 315° C. and therefore may not be brought into contact with molten aluminum. Preferably, said chemical removal is then carried out after said quenching step.

The aforementioned steps of the method referred to ferroalumination therefore allow a braking band, and therefore a brake disc, to be obtained with increased resistance to wear and corrosion.

It should be noted that the layer of ferroaluminum intermetallic compounds may comprise a plurality of intermetallic compounds between iron and aluminum, in particular Fe3Al, FeAl, FeAl2, FeAl3, Fe2Al5. The prevailing intermetallic phase is FeAl3 as it is thermodynamically more stable.

According to an embodiment, the method provides for depositing an auxiliary ferritic-nitrocarburization and an auxiliary ferroalumination layer between one of the two braking surfaces 2*a*, 2*b* of the braking band and the base layer 30, and/or between one of the two braking surfaces 2*a*, 2*b* of the braking band and the intermediate layer 300, and/or between the base layer 30 and the protective surface coating 3, and/or between the intermediate layer 300 and the base layer 30.

As may be appreciated from the above description, the brake disc according to the invention allows the drawbacks of the prior art to be overcome.

By virtue of the combination of a steel base layer with reduced nickel content or even totally nickel-free with a cast iron band, the brake disc 1 according to the invention is substantially not subject to the production and release of nickel particles during operation.

Not only that, according to particularly advantageous variants, the addition of a protective surface coating 3 which includes or is coated with carbides, allows both the wear resistance properties to be improved, also compensating for the lack of nickel in the steel of the base layer, and adequate and increased mechanical strength to be provided.

Particularly advantageously, the base layer 30 composed of totally nickel-free steel and 10% to 15% chromium (Cr), at most 1% of silicon (Si), at most 4% of manganese (Mn), from 0.16% to 0.5% of carbon (C), preferably from 0.16% to 0.25% of carbon (C), and for the balance of iron (Fe), allows a martensitic steel without nickel to be made with less brittleness during use at high temperatures and at the same time an adequate anticorrosive coating. These advantageous aspects are also synergistically combined with the possibility of using a reduced percentage of any carbides included in the steel, thus reducing the resources necessary for production, while maintaining an adequate hardness of the coating.

Advantageously, the base layer 30, preferably nickel-free, also performs a mechanical "cushioning" function for the protective surface coating 3 (anti-wear). The base layer 30, in fact, assumes an elastic behavior which allows the stresses imparted to the disc to be attenuated at least in part when in use. The base layer 30 therefore operates as a sort of shock absorber or cushion between the disc and the protective surface coating 3. In this way, a direct transmission of stresses between the two parts is avoided, thus also reducing the risk of initiation of cracks in the protective surface coating 3.

The invention claimed is:

1. A brake disc for a disc brake, comprising a braking band provided with two opposite braking surfaces, each of which defines at least partially one of two main faces of the disc, the braking band being made of gray cast iron or steel;

said disc being provided with a base layer which covers at least one of the two braking surfaces of the braking band, said base layer being composed of steel totally free from nickel and of one or more carbides included in the nickel-free steel, and wherein an intermediate layer composed of nickel-free steel is interposed between the base layer and at least one of the two braking surfaces of the braking band, wherein the steel of the base layer has a content of molybdenum comprised between 0.5% and 10%, and a content of manganese between 0.5% and 7%.

2. The brake disc for the disc brake according claim 1, comprising a protective surface coating which covers the base layer at least on a side of one of the two braking surfaces of the braking band, said protective surface coating being arranged on a side of the base layer which does not face towards the one of the two braking surfaces, said protective surface coating being composed of one or more carbides in particle form deposited by a Thermal Spray deposition technique, comprising an HVOF (High-Velocity Oxy-Fuel) technique, or by an HVAF (High-Velocity Air Fuel) technique, or by an APS (Atmosphere Plasma Spray) technique, or by a Cold Spray deposition technique, comprising e.g. a KM (Kinetic Metallization) technique, or by a laser beam deposition technique, comprising a LMD (Laser Metal Deposition), or an HSLC (High-Speed Laser Cladding) technique, or an EHLA (Extreme High-Speed Laser Application) technique, or an TSC (Top Speed Cladding) technique.

3. The brake disc for the disc brake according to claim 2, wherein the one or more carbides in particle form comprise tungsten carbide (WC) or chromium carbide or niobium carbide (NbC) or titanium carbide (TIC).

4. The brake disc for the disc brake according to claim 3, wherein the carbides in particle form are composed of chromium carbide and titanium carbide.

5. The brake disc for the disc brake according to claim 1, wherein in the base layer the one or more carbides included comprise at least one carbide selected from a group comprising: tungsten carbide (WC), chromium carbide, niobium carbide (NbC), titanium carbide (TiC).

6. The brake disc for the disc brake according to claim 1, wherein the steel of the base layer comprises at least 15% of chromium (Cr).

7. The brake disc for the disc brake according to claim 1, wherein the steel of the base layer comprises between 10% and 20% of chromium (Cr).

8. The brake disc for the disc brake according to claim 1, wherein the steel of the base layer is composed of 10% to 20% of chromium (Cr), at most of 1.5% of silicon (Si), at most of 2% of manganese (Mn), at most of 0.03% carbon (C) and, for the balance, iron (Fe).

9. The brake disc for the disc brake according to claim 1, wherein the base layer has a thickness comprised between 20 μm and 300 μm.

10. A method for making a brake disc comprising the following operating steps: a) preparing a brake disc, comprising a braking band provided with two opposite braking surfaces, each of which defines at least partially one of two main faces of the disc, the braking band being made of gray cast iron or steel;

a1) after step a), depositing on at least one of the two opposite braking surfaces, an intermediate layer composed of nickel-free steel;

b) after step a1), depositing a base layer composed of steel totally free from nickel, wherein the step b) of depositing the base layer comprises depositing a composition in particle form composed of nickel-free steel, by means of a laser deposition technique, or by means of a Thermal Spray deposition technique, or by means of a Cold Spray deposition technique, depositing an auxiliary layer of ferritic-nitrocarburization between one of the two braking surfaces of the braking band and the base layer, and/or between one of the two braking surfaces of the braking band and the intermediate layer, and/or between the base layer and a protective surface coating, and/or between the intermediate layer and the base layer.

11. The method according to claim 10, wherein, in step b) the composition in particle form further comprises carbides mixed in a percentage not exceeding 50% by weight of the total particulate composition.

12. The method according to claim 10, further comprising a step c) of depositing over said base layer a material in particle form composed of tungsten carbide (WC) or niobium carbide (NbC) or titanium carbide (Tic) or chromium carbide by a Thermal Spray deposition technique comprising HVOF (High-Velocity Oxy-Fuel) technique, a HVAF (High-Velocity Air Fuel) technique, an APS (Atmosphere Plasma Spray) technique or a Cold Spray deposition technique comprising a KM (Kinetic Metallization) technique, or by a laser beam deposition technique comprising a LMD (Laser Metal Deposition) technique, or by a HSLC (High-Speed Laser Cladding) technique, or by a EHLA (Extreme High-Speed Laser Application) technique, or by the TSC (Top Speed Cladding) technique, forming a protective surface coating which covers the base layer, preferably at least for an entire surface of one of the two braking surfaces of the braking band.

13. A brake disc for a disc brake, comprising a braking band provided with two opposite braking surfaces, each of which defines at least partially one of two main faces of the disc, the braking band being made of gray cast iron or steel;

said disc being provided with a base layer which covers at least one of the two braking surfaces of the braking band, said base layer being composed of steel totally free from nickel and of one or more carbides included in the nickel-free steel, and wherein an intermediate layer composed of nickel-free steel is interposed between the base layer and at least one of the two braking surfaces of the braking band, wherein the steel of the base layer is composed of 10% to 20% of chromium (Cr), at most of 1.5% of silicon (Si), at most of 2% of manganese (Mn), at most of 0.03% carbon (C) and, for the balance, iron (Fe).

14. A method for making a brake disc comprising the following operating steps:

a) preparing a brake disc, comprising a braking band provided with two opposite braking surfaces, each of which defines at least partially one of two main faces of the disc, the braking band being made of gray cast iron or steel;

a1) after step a), depositing on at least one of the two opposite braking surfaces, an intermediate layer composed of nickel-free steel;

b) after step a1), depositing a base layer composed of steel totally free from nickel wherein the step b) of depositing the base layer comprises depositing a composition in particle form composed of nickel-free steel, by means of a laser deposition technique, or by means of a Thermal Spray deposition technique, or by means of a Cold Spray deposition technique, depositing an auxiliary ferroalumination layer between one of the two braking surfaces of the braking band and the base layer, and/or between one of the two braking surfaces of the braking band and the intermediate layer, and/or between the base layer and a protective surface coating, and/or between the intermediate layer and the base layer, wherein the step of depositing the auxiliary ferroalumination layer comprises the step of: immersing at least partially said braking band into molten aluminum maintained at a predetermined temperature so that the molten aluminum covers at least a predetermined surface region of said braking band, said immersion being protracted for a predetermined period of time to allow diffusion of aluminum atoms into a surface microstructure of said cast iron or steel with consequent formation of ferroaluminum intermetallic compounds in a surface layer of said braking band, thus generating a layer comprising of ferroaluminum intermetallic compounds in said predetermined surface region of said braking band;

removing said braking band from the molten aluminum;

removing any aluminum remaining on said braking band after extraction, so as to expose said ferroaluminum intermetallic compounds on the surface, said ferroaluminum intermetallic compounds exposed on the surface imparting a superior resistance to corrosion and wear at said predetermined surface region to said braking band made of cast iron or steel.

* * * * *